INVENTORS
EDWARD GOLDBERG
SAMUEL A. BARASH
HAROLD MOREINES
BY
ATTORNEY

United States Patent Office 3,067,969
Patented Dec. 11, 1962

3,067,969
FLIGHT PATH CONTROL APPARATUS
Edward Goldberg, Brooklyn, and Samuel A. Barash, New York, N.Y., and Harold Moreines, Hillside, N.J., assignors to The Bendix Corporation, a corporation of Delaware
Filed Aug. 28, 1957, Ser. No. 680,830
7 Claims. (Cl. 244—77)

The invention relates generally to flight path control apparatus for automatically guiding a craft in horizontal and vertical planes by radio signals and, more particularly, to a control monitor for applying the radio signals to the automatic pilot only when the signals are above a predetermined minimum amplitude. The apparatus may be generally of the kind described and claimed in Patent No. 2,592,173 issued April 8, 1952, to Paul A. Noxon, Alan M. MacCallum and Alfred Bennett, and Patent No. 2,704,647, issued March 22, 1955, to Raymond I. Myers and Corles M. Perkins, both of the patents being assigned to the same assignee as the present invention.

Apparatus of this general character, as used heretofore, has radio receivers for receiving the localizer, range and glide path signals transmitted from the field. The signals from the receivers are applied to a flight path computer and the output of the computer controls the automatic pilot on the craft. A cross-pointer indicator receives the signals from the receiver and has a vertical pointer responsive to localizer or range signals and a horizontal glide path pointer responsive to the glide path signal to indicate the course and elevation of the craft relative to the radio beams. The cross-pointer indicator also includes localizer or range and glide path flags for indicating to the pilot that localizer, range and glide path signals are being received by the radio receivers.

Before the craft is controlled by the flight path control, it is necessary, for best operation of the craft, that the signals from the radio receivers are of predetermined minimum strength.

Flight path control apparatus heretofore used a control monitor which connected the automatic pilot for control by the radio beam when the radio signal was above a predetermined minimum strength and which disconnected the automatic pilot from control by the radio beam when the radio signal was below the predetermined minimum strength. The control monitor used a relay for this purpose which operated linearly relative to the input signal amplitude so that the on-off operation of the relay was determined largely by the hysteresis characteristics of the relay and, consequently, required a substantially large signal variation to operate the relay, thereby creating a large range of signal strength uncertainty as to radio beam reliability.

One object of the present invention is to provide a mobile craft radio guidance system having a novel control monitor for dependably monitoring control of the automatic pilot by the radio signal as determined by the strength of the radio signal.

Another object of the invention is to provide a mobile craft radio guidance system having a novel control monitor for monitoring control of the automatic pilot by the radio signal which operates upon a small change in signal strength from a predetermined level to minimize uncertainty as to the strength of the signal and beam reliability.

Another object is to provide a novel control monitor which is highly sensitive and reliable.

Another object is to eliminate the use of vacuum tubes and minimize the effects of temperature variations.

The invention contemplates a navigation system for mobile craft having a receiver for receiving radiant energy from a beam transmitted from a remote point and providing an output corresponding to the position of the craft relative to the beam axis and providing direct current signals corresponding to the strength of the radiant energy received by the receiver, an automatic pilot for controlling the flight of the craft, means for rendering the automatic pilot responsive to the output of the receiver when the signals are above a predetermined minimum and for rendering the automatic pilot unresponsive to the output of the receiver when the signals are below the predetermined minimum, and a control monitor connected to the receiver and responsive to the signals for operating the means, the monitor including a modulator for providing alternating current voltage which reverses phase when the signal is at the predetermined minimum, a phase-sensitive demodulator for converting the alternating current voltage to direct current voltage corresponding in polarity to the phase of the alternating current voltage, and gating means having its input connected to the demodulator and its output connected to the first mentioned responsive means and operating the first mentioned responsive means when the direct current signal from the receiver is at the predetermined amplitude.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
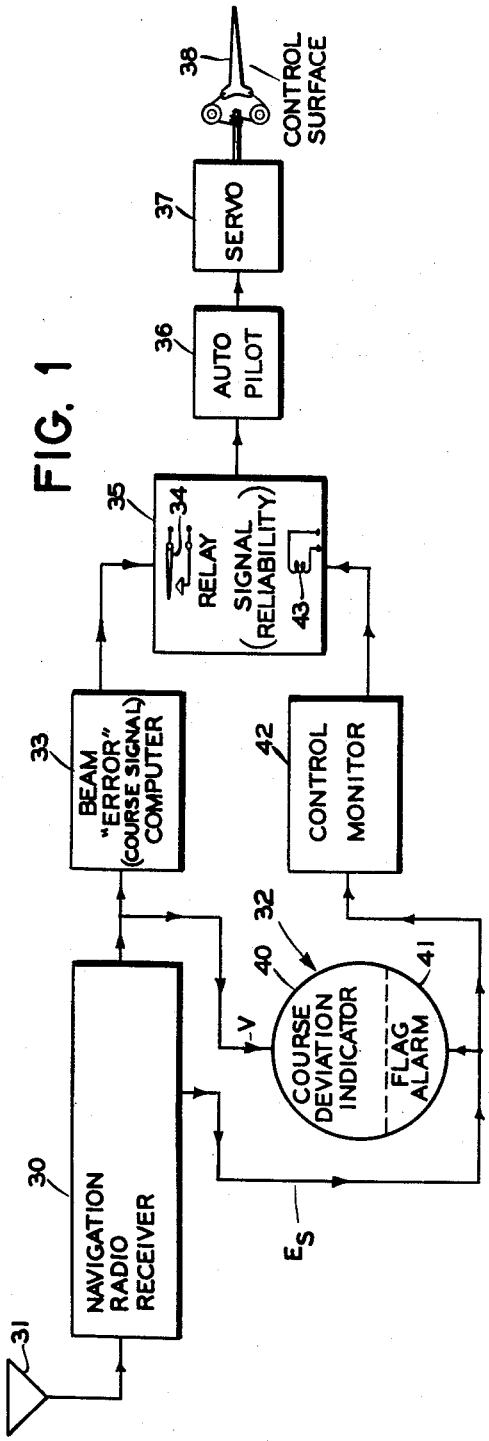
FIG. 1 is a block diagram of a navigational system using the present invention.

Referring to the drawings, the flight path control is shown in FIG. 1 as comprising an antenna 31 connected to a radio receiver 30 for receiving radio signals from the localizer, range and/or glide path transmitter. The receiver develops at its output a reversible D.C. voltage V of one polarity when the craft is at one side of the associated radio beam axis and of the opposite polarity when the craft is at the other side of the associated radio beam axis. Also, the radio receiver develops at its output a D.C. voltage $E_s$ of fixed polarity corresponding to the strength of the associated radio beam. The D.C. voltages V, $E_s$ from the radio receiver are applied to a cross-pointer indicator 32 having a flag alarm 41 responsive to the voltage $E_s$ of fixed polarity and a course deviation indicator 40 responsive to the voltage V of reversible polarity. Flag alarm 41 indicates whether the strength of the associated signal is above or below a predetermined minimum and course deviation indicator indicates the position of the craft relative to the radio beam axis.

The voltage V from radio receiver 30 also is applied to a beam error computer 33 which provides an output corresponding to the position of the craft relative to the beam axis. The output of computer 33 is applied through contacts 34 of a relay 35 to an automatic pilot 36 which controls operation of a servo 37 operatively connected to a control surface 38.

The voltage $E_s$ from radio receiver 30 also is applied to a novel control monitor 42, constructed according to the invention, which is connected to the control winding 43 of relay 35 to control operation of the relay. The relay is closed when the signal $E_s$ is above a predetermined minimum to connect the automatic pilot 36 to the output of the computer 33 and the relay is open when the voltage $E_s$ is below a predetermined minimum to disconnect the automatic pilot from the computer.

With the aforementioned arrangement, when the aircraft moves into a zone where the radio signal may be relied upon, the control monitor energizes relay 35 so that the beam error signal controls operation of the automatic pilot, and when the aircraft moves into a zone where the radio signal is unreliable, the control monitor deenergizes relay 35 so that the automatic pilot is no longer controlled by the beam error signal.

While only one channel of the navigation system is shown, it should be understood that a separate channel is required for controlling the aircraft in azimuth and elevation relative to the radio beams and that the invention may be used in both channels.

Figure 2:
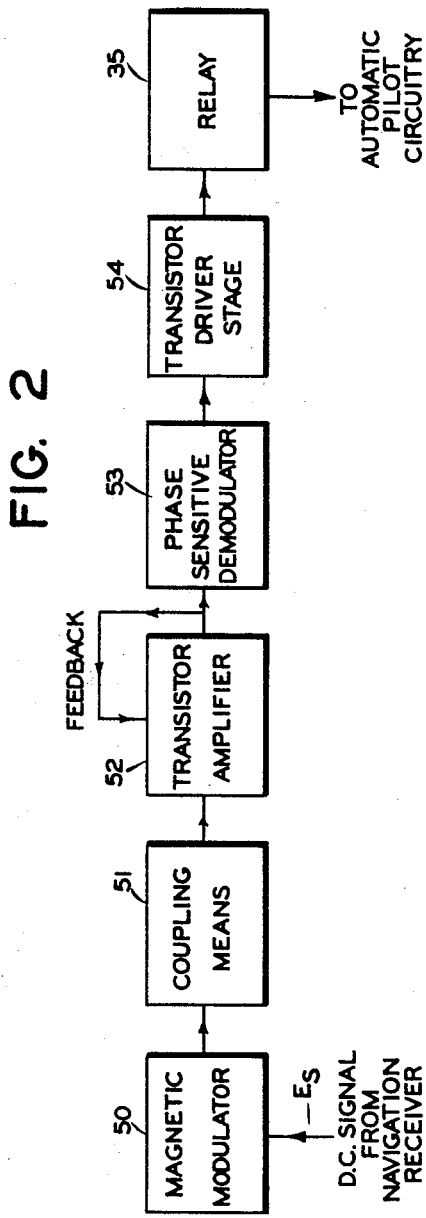
FIG. 2 is a block diagram of the novel control monitor shown in FIG. 1.

The block diagram in FIG. 2 shows the control monitor 42 which comprises a magnetic modulator 50 which receives the unidirectional voltage $E_s$ from radio receiver 30 and provides an alternating current output of one phase or of opposite phase as determined by the amplitude of the radio signal whether it is above or below a predetermined level. The alternating current output from modulator 50 is applied through coupling means 51 to a transistor amplifier 52 having a negative feedback connection. A phase sensitive demodulator 53 is connected to amplifier 52 and receives the amplified signal and converts it to a D.C. voltage which is amplified by a transistor driver stage 54 whose output controls operation of relay 35..

Figure 3:
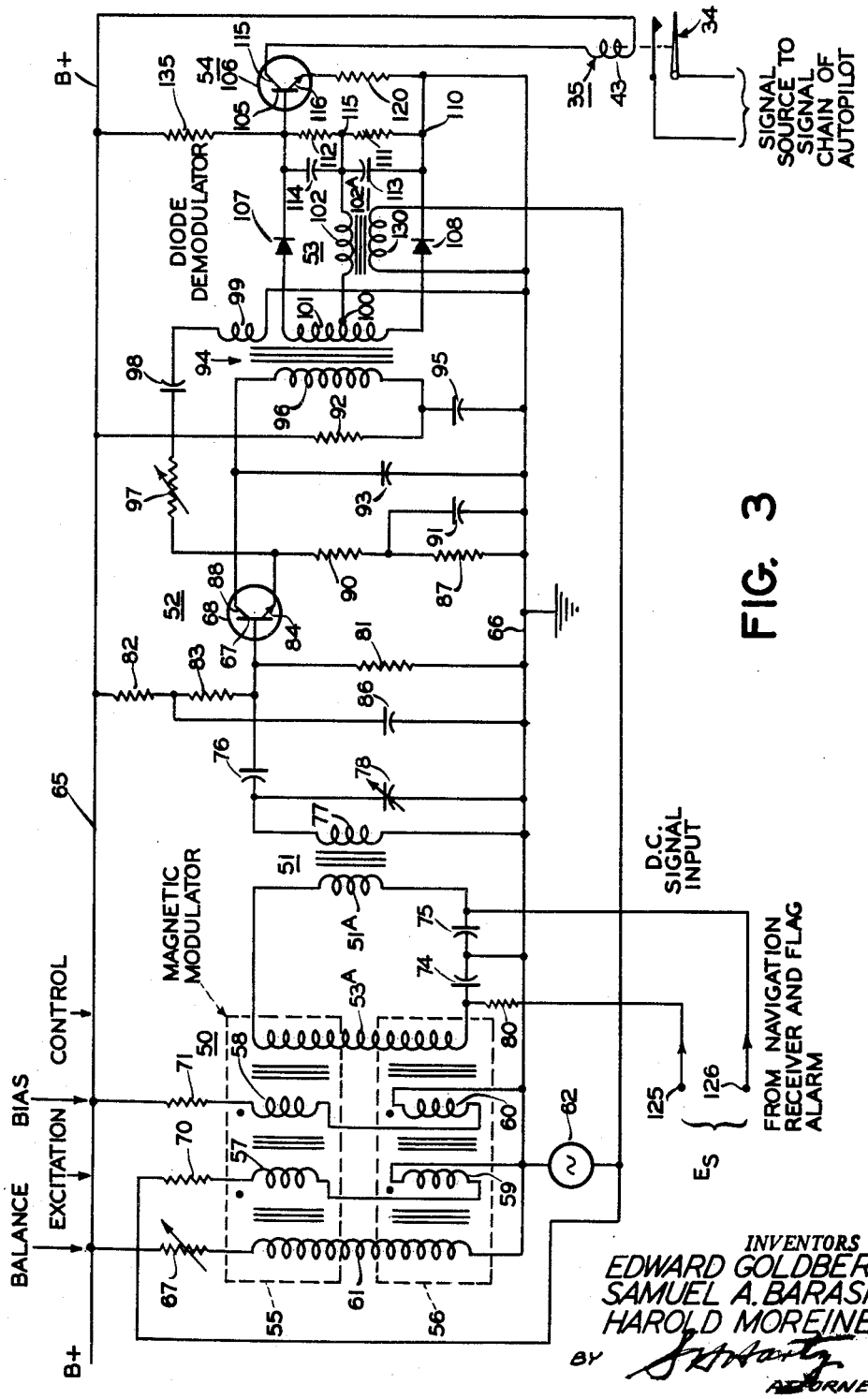
FIG. 3 is a detailed schematic diagram of the control monitor shown in the block diagram of FIG. 2.

In FIG. 3, the control monitor 42 is shown schematically and comprises a magnetic modulator 50 generally of the kind shown and described in copending application Serial No. 459,260, now U.S. Patent No. 2,809,353, assigned to the same assignee as the instant application. Magnetic modulator 50 has two magnetically separate cores 55 and 56 of high permeability magnetic material on which are wound series opposed excitation windings 57 and 59 and series opposed bias windings 58 and 60, a balance winding 61 and a control winding 53A. Balance winding 61 and control winding 53A each are wound around both cores 55 and 56. A source of alternating current 62 is connected across excitation windings 57, 59 and series resistor 70. Bias windings 58 and 60 are connected in series with a resistor 71 to the B+ source by a conductor 65 and to ground by a conductor 66. Balance winding 61 is connected in series with a variable resistor 67 to conductors 65 and 66 and resistor 67 is adjusted to determine the D.C. signal amplitude at which phase reversal of the modulated signal occurs and at which the relay 35 operates. Resistor 70 determines the voltage for exciting windings 57, 59 and resistor 71 determines the D.C. bias current for bias windings 58, 60.

Winding 53A functions as both a control winding and output winding and is connected to primary winding 51A of coupling transformer 51. Condensers 74 and 75 are connected to ground conductor 66 between control winding 53 and primary winding 51A. Radio signal $E_s$ is applied through a series limiting resistor 80 across control winding 53A and primary winding 51A of transformer 51 and condensers 74 and 75 isolate the direct current voltage $E_s$ from ground.

In the arrangement described, when the radio signal $E_s$ is above a predetermined amplitude, the magnetic modulator will provide an alternating current voltage across primary winding 51A of transformer 51 of one phase and, when the radio Signal $E_s$ is below the predetermined amplitude, the magnetic modulator will produce a signal of opposite phase across primary winding 51A. The value of resistor 67 determines the amplitude at which phase reversal occurs.

Resistors 82 and 83 are connected between B+ lead 65 and base 67 of transistor 68 and resistor 81 is connected between base 67 and ground lead 66 and these three resistors 81, 82 and 83 comprise a network to determine D.C. bias voltage of base 67 and emitter 84 of the transistor 68 and aids in bias stabilization with temperature variations. A condenser 86 is connected to resistors 82 and 83 and to ground lead 66 and decouples spurious signals at base 67 from B+ to ground. Resistors 87 and 90 are connected in series between emitter 84 of transistor 67 and ground conductor 66. Resistor 87 fixes the D.C. collector current through the transistor, and degenerate feedback resistor 90 controls amplification of the stage and sensitivity of the entire amplifier. A condenser 91 is connected in parallel with resistor 87 to bypass A.C. signals across resistor 87 and thus prevent excessive A.C. degeneration.

Primary winding 96 of a transformer 94 is connected to collector 88 of transistor 68 and through a condenser 95 to ground lead 66 and through a resistor 92 to B+ lead 65. Transformer 94 connects the output of amplifier stage 52 to the input of phase sensitive diode demodulator 53. The transformer is properly designed to match the impedance of the two diode circuits and provides sufficient voltage to operate the demodulator and transistor output stages. Resistor 92 fixes the D.C. voltage at collector 88 and, in conjunction with the base voltage collector current and load, determines the maximum A.C. output voltage available from transistor 68 without cut-off or saturation. Condenser 95 decouples spurious signals from B+ at collector 88.

A condenser 93 is connected between collector 88 of transistor 68 and ground lead 66 and tunes transformer 94 for maximum output from the amplifier stage and for zero phase shift through the transformer.

Transformer 94 has a secondary feedback winding 99 connected through a coupling condenser 98 and a variable resistor 97 to emitter 84 of transistor 68. Resistor 97 controls the amount of negative feedback and gain of the amplifier stage 52. Condenser 98 prevents D.C. current from flowing in the feedback path to ground through transformer winding 99. The negative feedback stabilizes operation of the amplifier stage under varying temperature conditions and increases the input impedance of the amplifier stage. The negative feedback also reduces the output impedance of the amplifier presented to diode demodulator 53 and reduces the effect of rectified pulses appearing at transistor driver stage 54.

Transformer 94 has a center tapped secondary winding 101 connected at its ends to diodes 107 and 108 and its center tap 100 connected to secondary winding 102 of an excitation transformer 102A. Filter condensers 113, 114 and output resistors 111, 112 are connected in parallel, respectively, to diode 107, transformer secondary winding 102, and diode 108 and ground conductor 66. Primary winding 130 of transformer 102A is connected across power source 62 which provides A.C. reference excitation to operate the phase sensitive demodulator circuit 53. It will be observed that the modulator A.C. carrier and demodulator A.C. reference voltages are connected to the same A.C. source 62 which provides a common phase reference. Diodes 107 and 108 rectify the A.C. signal from amplifier stage 52 and provide a D.C. output corresponding in polarity and amplitude to the phase and amplitude of the A.C. signal. The diode demodulator rejects quadrature and second harmonics.

The D.C. output across resistors 111, 112 is applied to base 105 of transistor 106 of driver stage 54. Base 105 of transistor 106 is connected through a biasing resistor 135 to B+ conductor 65. A resistor 120 is connected to emitter 116 of transistor 106 and to ground conductor 66. Control winding 43 of relay 35 is connected between collector 115 of transistor 106 and B+ conductor 65 and operates relay contacts 34.

Resistors 111 and 112 together with resistor 135 provide a biasing network from B+ to base 105 of transistor 106 and to ground in addition to their function as part of the symmetrical demodulator circuit. This network establishes the quiescent or no-signal bias condition and aids in temperature stablization. The value of resistor 135 preferably is such as to provide substantially zero current flow in the relay upon reversal of polarity of the D.C. output of the diode demodulator so that conduction sufficient to operate the relay occurs with a small increase in signal strength. The center tap between resistors 111 and 112 provides a common connection to complete the current path of the demodulator through secondary winding 102 of excitation transformer 102A.

Substantially all of the voltage developed at base 105 of transistor 106 appears at emitter 116 and collector 115 because of inherent transistor characteristics. The voltage at emitter 116 controls D.C. current flow through resistor 120 in series with the emitter. The signal, therefore, controls the base voltage and the current through control winding 43 of relay 35 is proportional to the base voltage. The value of resistor 120 should be substantially large for best temperature characteristics and to reflect a large load to transistor 106. The transistor may be an NPN type which conducts when the base voltage goes positive or the transistor may be a PNP type which conducts when the base voltage goes negative. At polarity reversal the transistor is substantially cut off and does not conduct. Hence, when using an NPN type transistor the relay closes at a predetermined positive signal amplitude and opens below the predetermined signal amplitude and remains open for all lower or negative signal amplitudes.

The magnetic modulator may be biased for a certain predetermined signal input amplitude by impressing a direct current voltage of a value to establish the desired relay operating level across D.C. input terminals 125 and 126. Variable resistor 67 is then adjusted until an A.C. voltmeter placed across the output winding 53A of the modulator reads zero volts. This provides the correct bias voltage for the modulator to establish the desired operating voltage level of the signal reliability relay 35.

At a signal level less than the predetermined amplitude the output of the modulator is of such phase with respect to the reference voltage across the primary winding 130 of transformer 102A that the demodulator voltage applied to base 105 of transistor 106, with respect to the other terminal of the demodulator, is negative and the collector current through winding 43 of relay 35 is insufficient to operate the relay. This condition exists when the signal from the flag alarm of the course deviation indicator is below the predetermined minimum amplitude whereupon the beam signal from the beam error modulator 33 is not connected to the autopilot.

When the signal from the flag alarm is above the predetermined minimum amplitude, then the phase of the modulator output is reversed and the diode demodulator produces a positive bias on base 105 of transistor 106 and the collector current through winding 43 of relay 35 is sufficient to operate the relay.

The differential voltage between "pull-in" and "drop-out" is only a few micro-volts and does not exceed 8% of the input voltage. Operation of the relay is practically independent of relay hysteresis and the indeterminate range of signal variation is small as compared with previous control monitors which used a linear relay amplifier in contradistinction to the use of a current "off-set" magnetic modulator in conjunction with a phase sensitive demodulator.

From the foregoing it will be seen that when a signal of unreliable strength is impressed upon the magnetic modulator that the transistor of the driver stage is nonconducting. When the signal strength impressed upon the magnetic modulator is of reliable strength, the transistor driver becomes conductive and operates relay 35. The driver stage functions as a gating means to pass currents of one polarity and block currents of opposite polarity.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A control monitor responsive to a direct current signal for operating a circuit component when the signal is above a predetermined amplitude, comprising a modulator receiving the signal and providing an alternating current voltage which reverses phase when the signal is at the predetermined amplitude so that the voltage is of one phase when the signal is below the predetermined amplitude and of opposite phase when the signal is above the predetermined amplitude, a phase sensitive demodulator connected to the modulator for converting the alternating current voltage to a direct current voltage corresponding in polarity to the phase of the alternating current voltage, and gating means having its input connected to the demodulator and its output connected to the circuit component for energizing the circuit component when the signal is above the predetermined amplitude and for de-energizing the circuit component when the signal is below the predetermined amplitude.

2. A control monitor responsive to a direct current signal for operating a circuit component when the signal is above a predetermined amplitude, comprising a modulator receiving the signal and providing an alternating current voltage which reverses phase when the signal is at the predetermined amplitude so that the voltage is of one phase when the signal is below the predetermined amplitude and of opposite phase when the signal is above the predetermined amplitude, a phase sensitive demodulator connected to the modulator for converting the alternating current voltage to a direct current voltage corresponding in polarity to the phase of the alternating current voltage, and a driver amplifier having its input connected to the demodulator and its output connected to the circuit component and passing the direct current voltage when of one polarity to energize the circuit component and blocking the direct current voltage when of opposite polarity to deenergize the circuit component.

3. A control monitor responsive to a direct current signal for closing the contacts of a relay when the signal is above a predetermined amplitude, comprising a modulator receiving the signal and providing an alternating current voltage which reverses phase when the signal is at the predetermined amplitude so that the voltage is of one phase when the signal is below the predetermined amplitude and of opposite phase when the signal is above the predetermined amplitude, a phase sensitive demodulator connected to the modulator for converting the alternating current voltage to a direct current voltage corresponding in polarity to the phase of the alternating current voltage, and gating means having its input connected to the demodulator and its output connected to the relay for passing the direct current voltage when of one polarity for closing the contacts of the relay when the signal is above the predetermined amplitude and for blocking the direct current voltage when of opposite polarity for opening the contacts of the relay when the signal is below the predetermined amplitude.

4. A control monitor responsive to a direct current signal for closing the contacts of a relay when the signal is above a predetermined amplitude and for opening the contacts of the relay when the signal is below the predetermined amplitude, comprising a modulator receiving the signal and providing an alternating current voltage which reverses phase when the signal is at the predetermined amplitude so that the voltage is of one phase when the signal is below the predetermined amplitude and of opposite phase when the signal is above the predetermined amplitude, a phase sensitive demodulator for converting the alternating current voltage to a direct current voltage corresponding in polarity to the phase of the alternating current voltage, and an amplifier having its input connected to the demodulator and its output connected to the relay and passing the direct current voltage when of one polarity to energize the relay and blocking the direct current voltage when of opposite polarity to deenergize the relay.

5. A control monitor responsive to a direct current signal for closing the contacts of a relay when the signal is above a predetermined amplitude and for opening the contacts of the relay when the signal is below the predetermined amplitude, comprising a modulator receiving the signal and providing an alternating current voltage which reverses phase when the signal is at the predetermined amplitude so that the voltage is of one phase when the signal is below the predetermined amplitude and of opposite phase when the signal is above the predetermined amplitude, an amplifier for amplifying the alternating current voltage, coupling means connecting the amplifier to the modulator, a phase sensitive demodulator receiving the amplified voltage for converting the alternating current voltage to a direct current voltage corresponding in polarity to the phase of the alternating current voltage, and a driver amplifier having its input connected to the demodulator and its output connected to the relay and passing direct current voltage when of one polarity to energize the relay and blocking the direct current voltage when of opposite polarity to deenergize the relay.

6. In a navigation system for mobile craft having a receiver for receiving radiant energy from a beam transmitted from a remote point and providing an output corresponding to the position of the craft relative to the beam axis and providing direct current signals corresponding to the strength of the radiant energy received by the receiver, an automatic pilot for controlling the flight of the craft, means for rendering the automatic pilot responsive to the output of the receiver when the signals are above a predetermined minimum and for rendering the automatic pilot unresponsive to the output of the receiver when the signals are below the predetermined minimum, and a control monitor connected to the receiver and responsive to the signals for operating said means, said monitor including a modulator for providing alternating current voltage which reverses phase when the signal is at the predetermined minimum, a phase sensitive demodulator for converting the alternating current voltage to direct current voltage corresponding in polarity to the phase of the alternating current voltage, and gating means having its input connected to said demodulator and its output connected to said first mentioned means and operating said first mentioned means when the direct current signal from the receiver is at the predetermined amplitude.

7. In a navigation system for mobile craft having a receiver for receiving radiant energy from a beam transmitted from a remote point and providing an output corresponding to the position of the craft relative to the beam axis and providing direct current signals corresponding to the strength of the radiant energy received by the receiver, an automatic pilot for controlling the flight of the craft, means for rendering the automatic pilot responsive to the output of the receiver when the signals are above a predetermined minimum and for rendering the automatic pilot unresponsive to the output of the receiver when the signals are below the predetermined minimum, and a control monitor connected to the receiver and responsive to the signals for operating said means, said monitor including a modulator for providing alternating current voltage which reverses phase when the signal is at the predetermined minimum, a phase sensitive demodulator for converting the alternating current voltage to direct current voltage corresponding in polarity to the phase of the alternating current voltage, a driver amplifier having its input connected to said demodulator and its output connected to said means and passing the direct current voltage when of one polarity to energize said means and blocking the direct current voltage when of opposite polarity to deenergize said means.

References Cited in the file of this patent

UNITED STATES PATENTS

| | | |
|---|---|---|
| 2,225,700 | Laing | Dec. 24, 1940 |
| 2,685,665 | Price | Aug. 3, 1954 |
| 2,704,647 | Meyers et al. | Mar. 22, 1955 |
| 2,728,858 | Ziffer | Dec. 27, 1955 |
| 2,801,059 | Hecht et al. | July 30, 1957 |
| 2,807,758 | Pinckaers | Sept. 24, 1957 |
| 2,828,450 | Pinckaers | Mar. 25, 1958 |
| 2,931,577 | Bullen | Apr. 5, 1960 |